US011919736B2

(12) United States Patent
Rutherford

(10) Patent No.: US 11,919,736 B2
(45) **Date of Patent: *Mar. 5, 2024**

(54) SHORT TRAVEL PUSHER PLATE STACKING BIN

(71) Applicant: NCR Corporation, Atlanta, GA (US)

(72) Inventor: Craig Rutherford, Blairgowrie (GB)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,870

(22) Filed: Mar. 15, 2023

(65) Prior Publication Data

US 2023/0211971 A1 Jul. 6, 2023

Related U.S. Application Data

(63) Continuation of application No. 17/104,609, filed on Nov. 25, 2020, now Pat. No. 11,667,489.

(51) Int. Cl.

| | |
|---|---|
| ***B65H 31/06*** | (2006.01) |
| ***B65H 3/54*** | (2006.01) |
| ***B65H 29/46*** | (2006.01) |
| ***B65H 31/10*** | (2006.01) |
| ***B65H 83/02*** | (2006.01) |
| ***G07D 11/13*** | (2019.01) |

(Continued)

(52) U.S. Cl.
CPC ............... *B65H 31/06* (2013.01); *B65H 3/54* (2013.01); *B65H 29/46* (2013.01); *B65H 31/10* (2013.01); *B65H 83/02* (2013.01); *G07D 11/13* (2019.01); *G07D 11/16* (2019.01); *G07F 19/201* (2013.01); *G07F 19/202* (2013.01); *B65H 2403/41* (2013.01); *B65H 2405/11151* (2013.01); *B65H 2701/1912* (2013.01); *G07D 11/125* (2019.01); *G07D 2211/00* (2013.01)

(58) Field of Classification Search
CPC .................... B65H 29/46; B65H 31/06; B65H 2701/1912; B65H 31/10; B65H 2403/41; B65H 2405/11151; G07D 11/13; G07D 2211/00; G07D 11/16; G07D 11/125; G07F 19/201; G07F 19/202
USPC .................................................. 271/180, 181
See application file for complete search history.

(56) References Cited

U.S. PATENT DOCUMENTS 6,601,687 B1 * 8/2003 Jenrick ................ G07F 19/202 271/181
8,215,634 B2 * 7/2012 Nireki .................... B65H 29/46 271/147

(Continued)

*Primary Examiner* — Jeremy R Severson
(74) *Attorney, Agent, or Firm* — Schwegman Lundberg & Woessner, P.A.

(57) ABSTRACT

A pusher plate stacking bin apparatus is provided for a valuable media depository. The apparatus comprising a pusher plate driven by a rack and pinion apparatus to stack a media item that is in a final position within the apparatus onto a media stacking platform. The media item is urged into the final position such that a trailing edge of the media item overhangs and rests on a fixed media guide and such that a leading edge of the media item overhangs and rests on a hinged media guide with a bottom surface of the media item elevated above the media stacking platform. The rack and pinion apparatus drives the plate past the media guides causing the hinged media guide to drop and the media item to fold along the leading edge as the media item is stacked onto the platform.

19 Claims, 10 Drawing Sheets

(51) Int. Cl.

| | |
|---|---|
| ***G07D 11/16*** | (2019.01) |
| ***G07F 19/00*** | (2006.01) |
| *G07D 11/125* | (2019.01) |

(56) References Cited

U.S. PATENT DOCUMENTS

2006/0080252 A1* 4/2006 Doran ................ G06Q 20/1085
705/43
2006/0180516 A1* 8/2006 Yui ...................... G07D 11/175
414/788.9

* cited by examiner

SHORT TRAVEL PUSHER PLATE STACKING BIN

CROSS-REFERENCE TO RELATED APPLICATION

This application is a continuation of U.S. patent application Ser. No. 17/104,609, filed Nov. 25, 2020, which application and publication is incorporated herein by reference in its entirety.

BACKGROUND

An Automated Teller Machine (ATM) handles a variety of valuable media, such as checks during deposit transactions and currency during both cash and deposit transactions. For deposit transactions, the ATM's media depository will separately store and stack deposited checks into a check bin and store and stack currency into currency cassettes by denominations. A pusher plate stacking bin is used to provide a neat and reliable stack of media within the check bin.

However, conventional pusher plate stacking bins are expensive to manufacture and require a substantial space footprint within the ATM. The pusher plate stroke that is required is the main issue, which increases the size of the pusher plate stacking bins. That is, the pusher plate stroke requires valuable space within the ATM, which could be used to increase the check capacity within the check bin. The stroke is required regardless as to whether the bin is full or empty.

Common pusher plate stacking bins utilize a media platform with a spring-loaded return upwards. This means that the pusher plate is required to push against the spring force for every transaction. The mechanical apparatus deployed to achieve this pushing force is a combination of a scissor linkage driven by a ball screw. The amount of pushing force is relatively large and the ball screw is an expensive manufacturing component.

Unfortunately, the industry has done little to address the core design of the pusher plate stacking bins, since there appears to be a belief that the length of the pusher plate travel cannot be reduced without a loss in pusher plate stacking bin functionality. Notwithstanding, the industry is continually trying to redesign other ATM modules in attempts to reduce the overall space footprint required by the ATM. The sheer size of the ATM prohibits its use in some retail environments and even if the overall size of the ATM remained unchanged, achieving a reduction in size for some of the ATM modules without a loss in functionality for those modules would allow other modules to increase in size for providing new or enhanced functionality of those other modules.

SUMMARY

In various embodiments, a method of operating a pusher plate stacking bin, a system comprising a pusher plate stacking bin, and a pusher plate stacking bin are presented.

According to an aspect, a pusher plate stacking bin apparatus is provided. The pusher plate stacking bin apparatus comprising: a pusher plate, a media stacking platform, a rack and pinion apparatus, and springs. The media stacking platform opposing the pusher plate. The rack and pinion apparatus used to drive the pusher plate toward the media stacking platform when a media item is in a final position within the pusher plate stacking bin apparatus onto the media stacking platform. The springs are attached to the media stacking platform to compress and to maintain tension on the media item when forced onto the media stacking platform by the pusher plate and when the pusher plate retracts upward away from the media stacking platform after stacking the media item onto the media stacking platform.

DETAILED DESCRIPTION

Figure 1A:
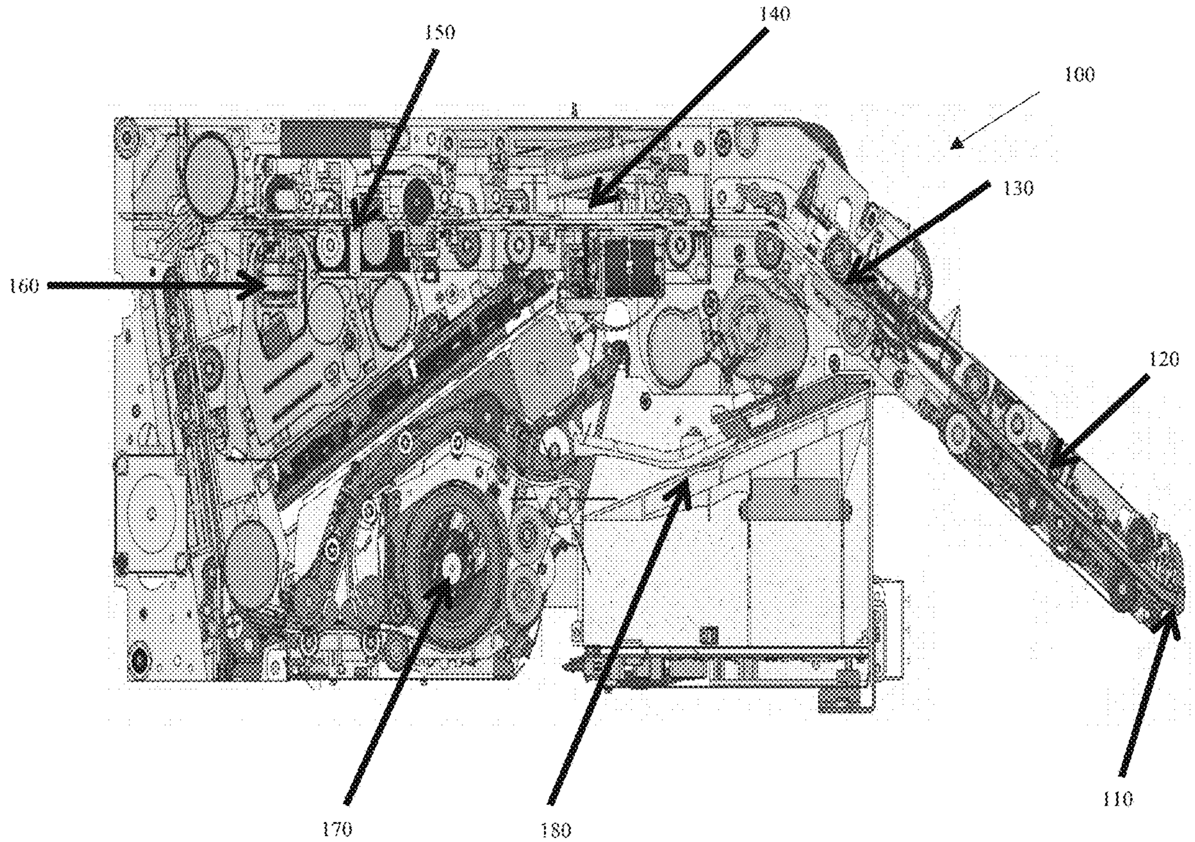
FIG. 1A is a diagram of a system comprising a pusher plate stacking bin, according to an example embodiment.

FIG. 1A is a diagram of a system 100 comprising a pusher plate stacking bin, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of a short travel pusher plate stacking bin presented herein and below.

As used herein the term "valuable media" refers to currency, bank notes, checks, or any media of value. The terms "valuable media," "media," "banknote," "note," "check," and "currency" may be used interchangeably and synonymously.

A "valuable media depository" refers to a component module of a transaction terminal responsible for storing valuable media for deposit transactions within one or more cassettes of the terminal and responsible for dispensing valuable media from the one or more cassettes during transactions at the transaction terminal.

A valuable media depository can include a media dispenser where deposited media is stored separately from media that is dispensed or the valuable media depository can include a recycler that dispenses media from a same storage where the media is deposited, such that the deposited media is recycled and utilized to fulfill dispense transactions.

Furthermore, the valuable media depository includes at least one bin associated with storing checks.

A "transaction terminal" refers to a multi-component/module composite device that permits valuable media to be deposited during deposit transactions and withdrawn during dispense transactions. A transaction terminal can include an Automated Teller Machine (ATM), a teller machine (operated by a teller on behalf of customers), a Self-Service Terminal (SST) operated by a customer during a checkout operation at a retail store, or a Point-Of-Sale (POS) terminal operated by a cashier on behalf of a customer during a checkout operation (the POS terminal including a dispenser/recycler and/or safe).

The transaction terminal comprises a variety of components, which are not relevant to the discussions herein other than the depository component that comprises a dispenser/recycler and check storage bin. The media when deposited is stored in cassettes and/or bins within a safe when the same cassettes used for deposited media is used to dispense media for dispense transactions, the component includes a recycler, and when the cassettes used for dispensing transactions is different from other cassettes that house deposit transactions, the component is a dispenser. Checks are stored in a bin of the depository.

A "component" or a "module" may be used synonymously and interchangeably herein and refers to an electromechanical device comprising mechanical parts and electromechanical parts. Electronic circuitry of the module may connect to a processor that is specific to and housed within the module or the electronic circuitry may connect to a processor that is external to and separate from the module.

As used herein a "transport path" refers to tracks and/or rollers within a dispenser or recycler and/or a module for transporting or urging the media item through the dispenser or the recycler and/or for transporting or urging the media item through other components of the transaction terminal during deposit of check storage operations and dispense operations being performed on the transaction terminal.

System 100 comprises a depository 100. The depository comprises a shutter module 110, an infeed module 120, a media separator module 130, a media deskew module 140, cameras 150, a Magnetic Ink Character Recognition (MICR) module 160, and a check stacking/storage bin module 180.

Deposited media is received at shutter module 110 and urged along a transport path to the infeed module 120. If a stack of media items were deposited, the stack is urged along the transport path to the separator module 130 where each media item is separated from the stack and provided along the transport path to the deskew module 140. Deskew module 140 orients the media properly along the transport path before ejecting the media along the transport path for imaging by a plurality of cameras/image sensors 150. Executable instructions receive the image data from cameras 150 and identify the type of media (currency or check); currency is validated to ensure the currency is not a counterfeit; and any check is validated for required fields, such as payor, payee, date, amount, signatures, etc. Any check is also read by MICR module 160 for identifying bank routing information, account information, check number information, etc. When the media is a check and passed through MICR module 160 it is urged along the transport path to an escrow module 170 for temporary storage pending verification by the executable instructions. Once verified, the check is ejected from escrow module 170 onto the transport path and fed to a novel check stacking module 180 for stacking and storing in a check bin.

It is to be noted that FIG. 1A may include a plurality of other modules and may be arranged differently; as such, FIG. 1A is presented for purposes of comprehending the overall path by which a check is received at a novel check stacking module 180 within a depository 100.

In an embodiment, depository 100 lacks or does not include escrow module 170.

Figure 1B:
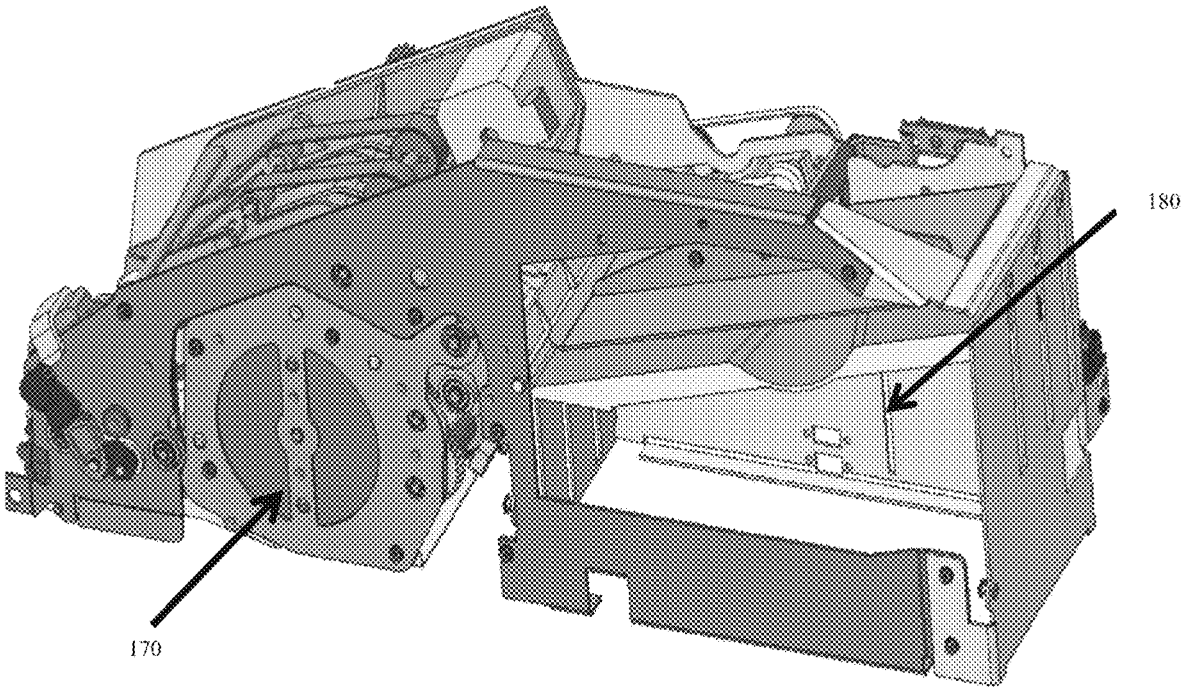
FIG. 1B is a diagram of an overall rear view of a pusher plate stacking bin, according to an example embodiment.
Figure 1C:
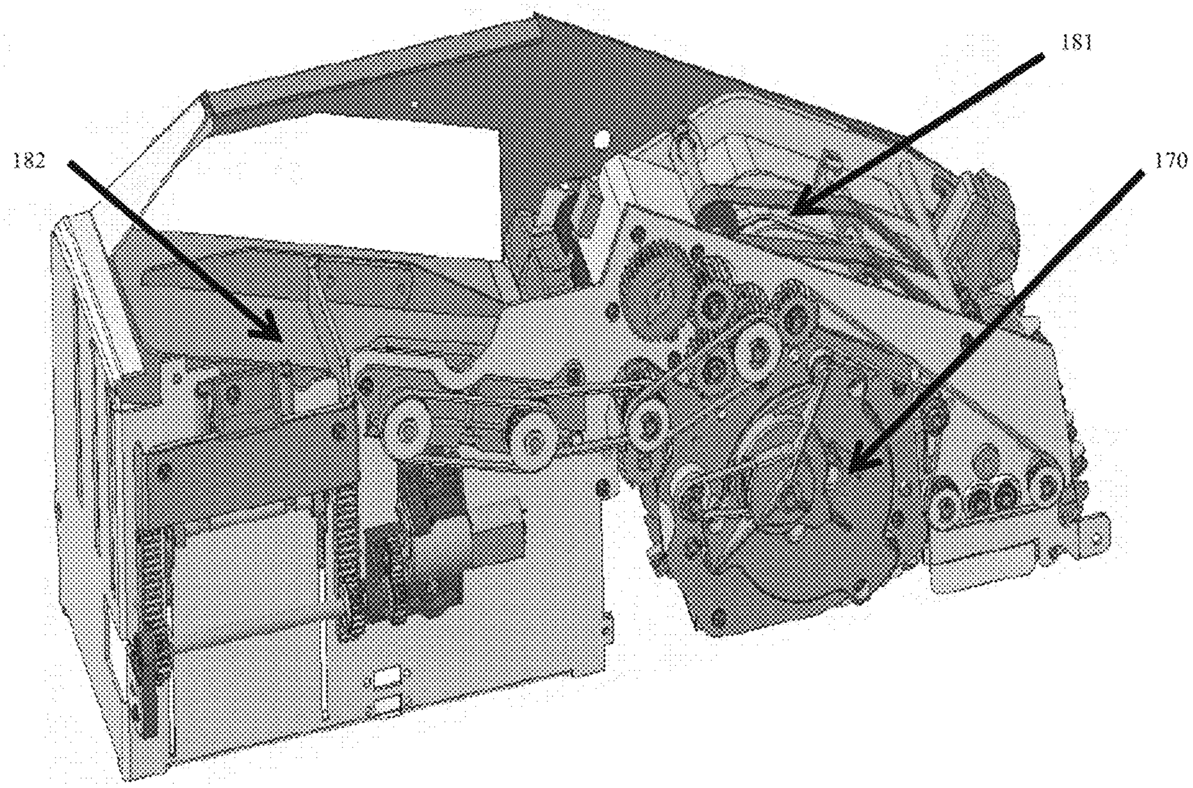
FIG. 1C is a diagram of an overall front view of the pusher plate stacking bin, according to an example embodiment.

In an embodiment, depository 100 includes an escrow module 170 (as illustrated in FIGS. 1B and 1C below).

FIG. 1B is a diagram of an overall rear view of a pusher plate stacking bin module/apparatus 182, according to an example embodiment.

FIG. 1B illustrates a check stacking module 180 comprising an escrow module 170 and a pusher stacking plate bin apparatus 182.

FIG. 1C is a diagram of an overall front view of the pusher plate stacking bin apparatus 182, according to an example embodiment.

FIG. 1C illustrates the transport apparatus/path 181 that urges the check into the check stacking module 180 and into the pusher stacking plate bin apparatus 182.

Figure 1D:
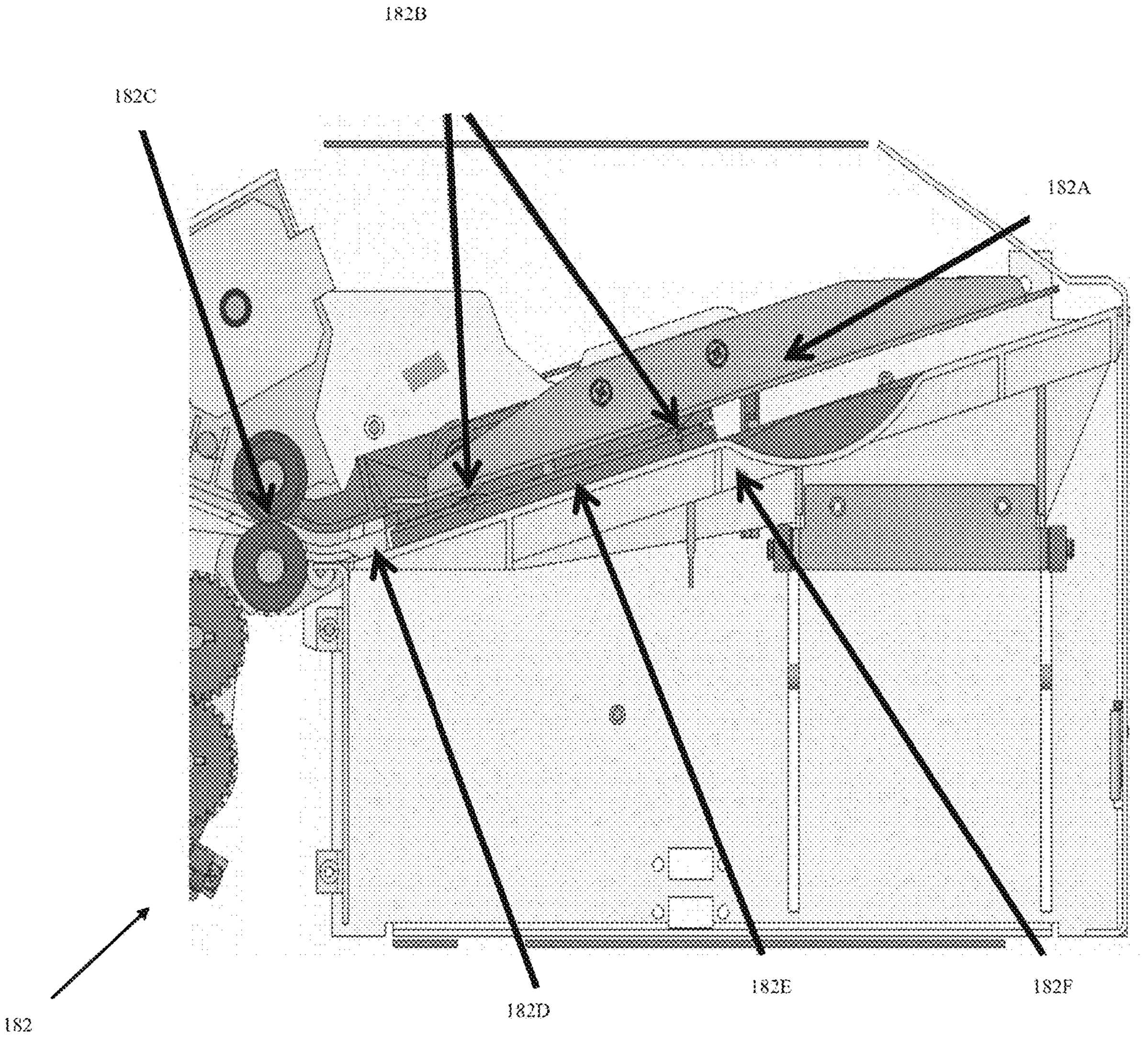
FIG. 1D is a diagram of a cross-sectional view of the stacking bin apparatus for the pusher plate stacking bin, according to an example embodiment.

FIG. 1D is a diagram of a cross-sectional view of the stacking bin apparatus for the pusher plate stacking bin apparatus 182, according to an example embodiment.

FIG. 1D illustrates components of the pusher stacking plate bin apparatus 182. More specifically, a pusher stacking plate 182A is illustrated in an upper position with upper and lower rollers 182B to urge a check into a bin entry area by full width transport rollers 182C over a fixed media guide 182D and a hinged media guide 182E above a media platform 182F. Media platform 182F is shown in FIG. 1D in a sprung orientation indicating that the media platform 182F is empty (highest point—lacks any check stacked on platform 182F). Platform 182F is suspended on tension springs (182F-2 shown in FIG. 1I below).

Figure 1E:
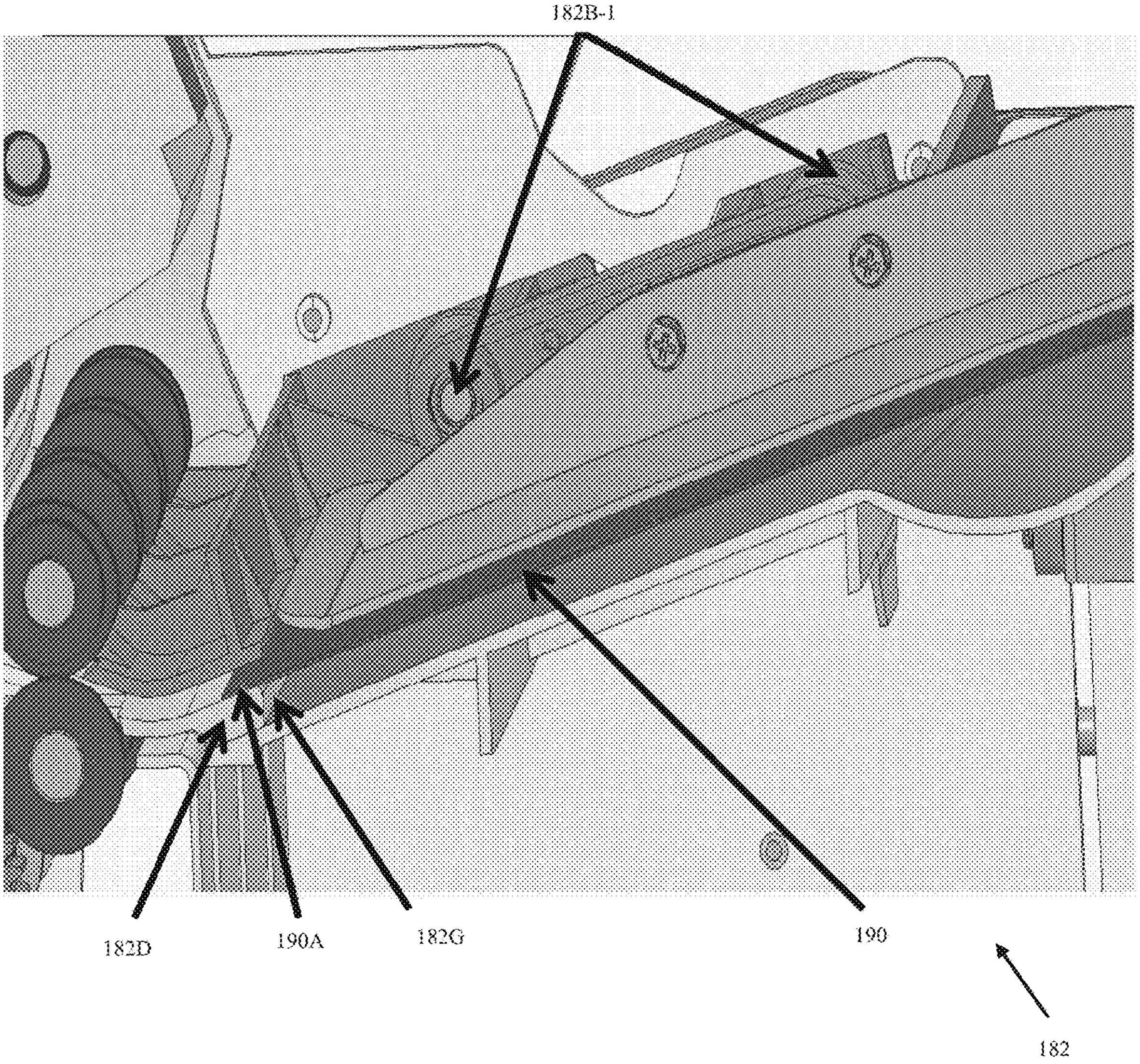
FIG. 1E is a diagram of a cross-sectional view having detail of a check in final position before a stacking plate is actuated, according to an example embodiment.
Figure 1F:
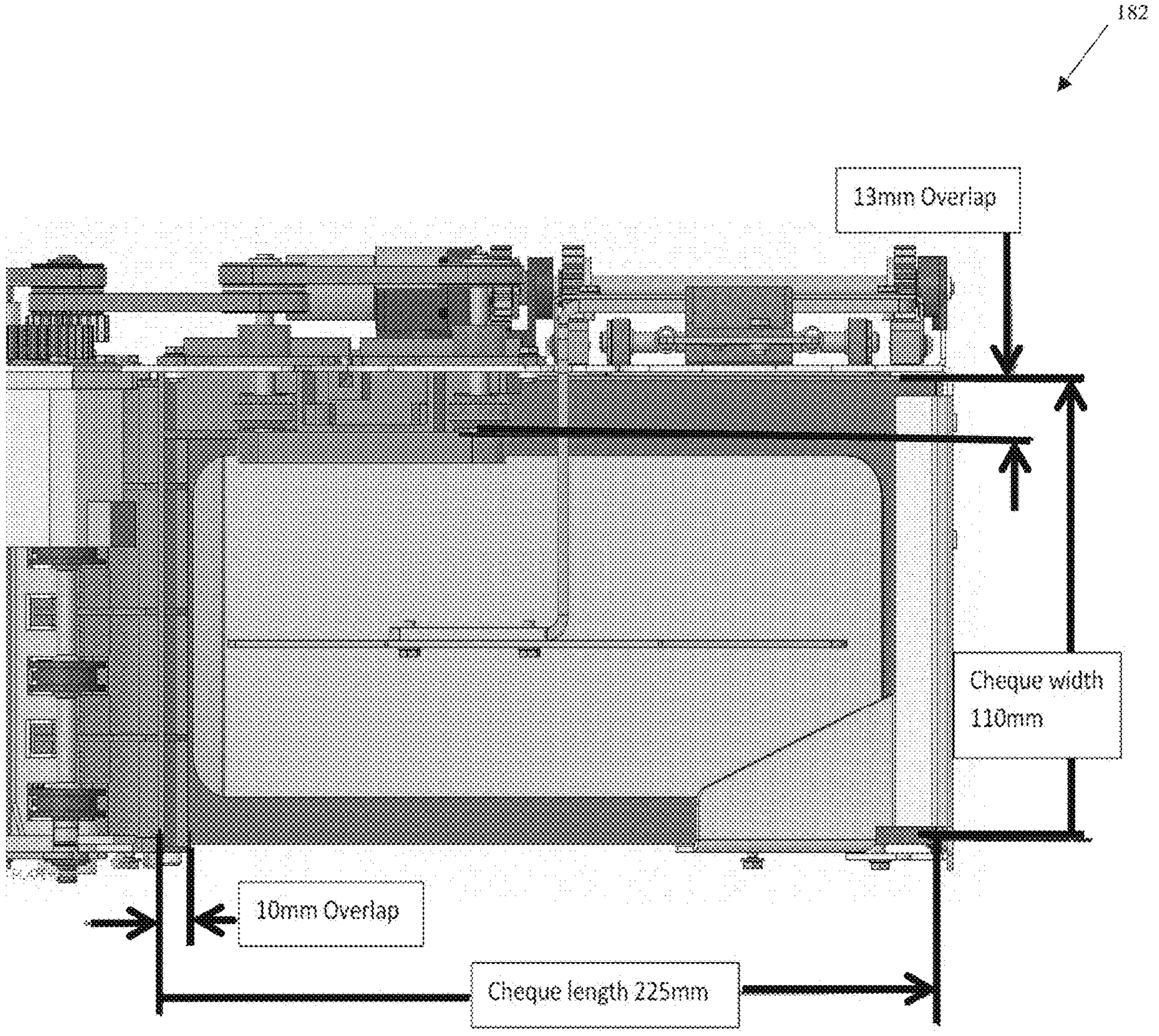
FIG. 1F is a diagram of a top-down view of the stacking bin with a check in position before the stacking plate is actuated, according to an example embodiment.
Figure 1G:
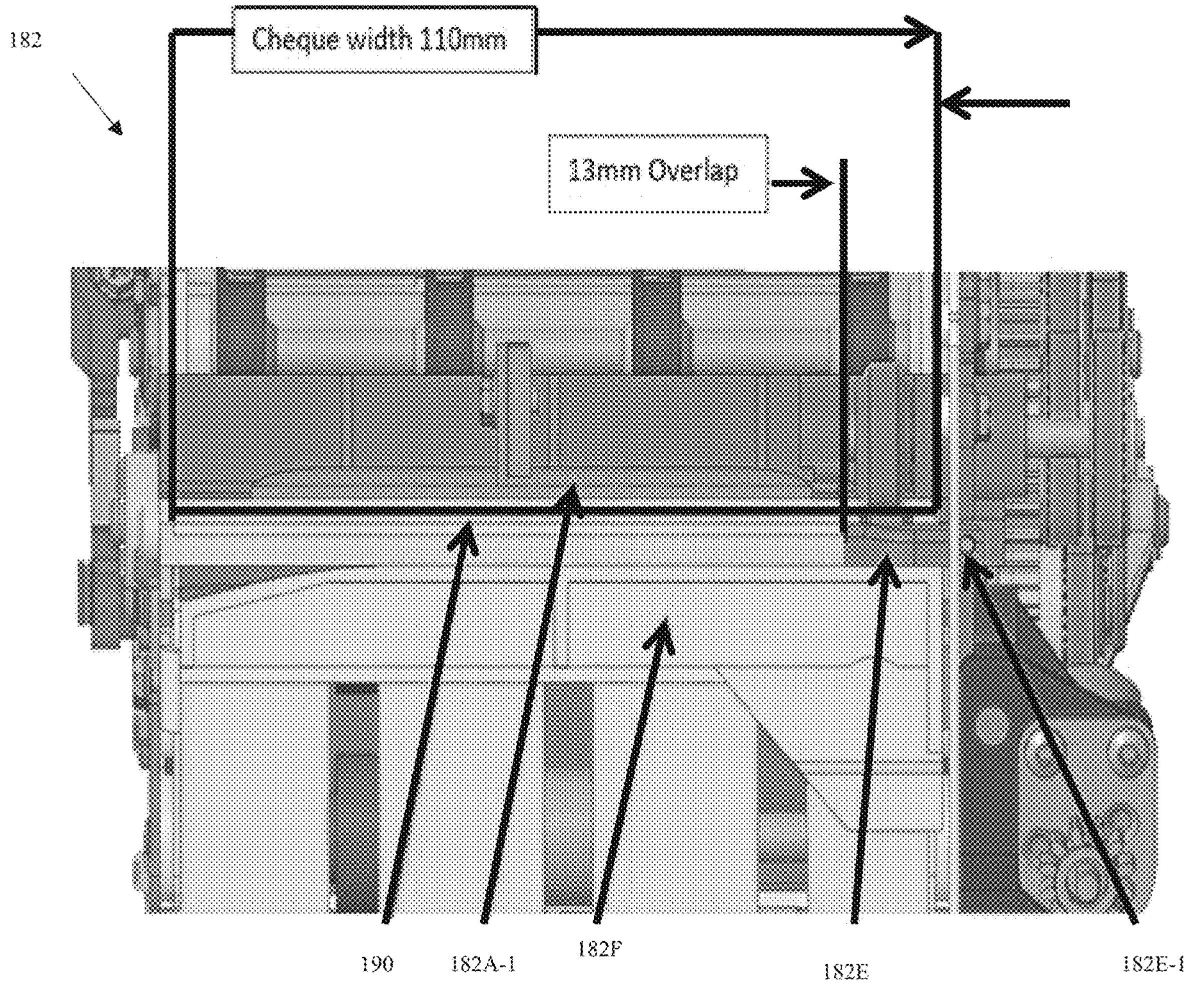
FIG. 1G is a diagram of an end-sectional view of the check in position before the stacking plate is actuated, according to an example embodiment.
Figure 1H:
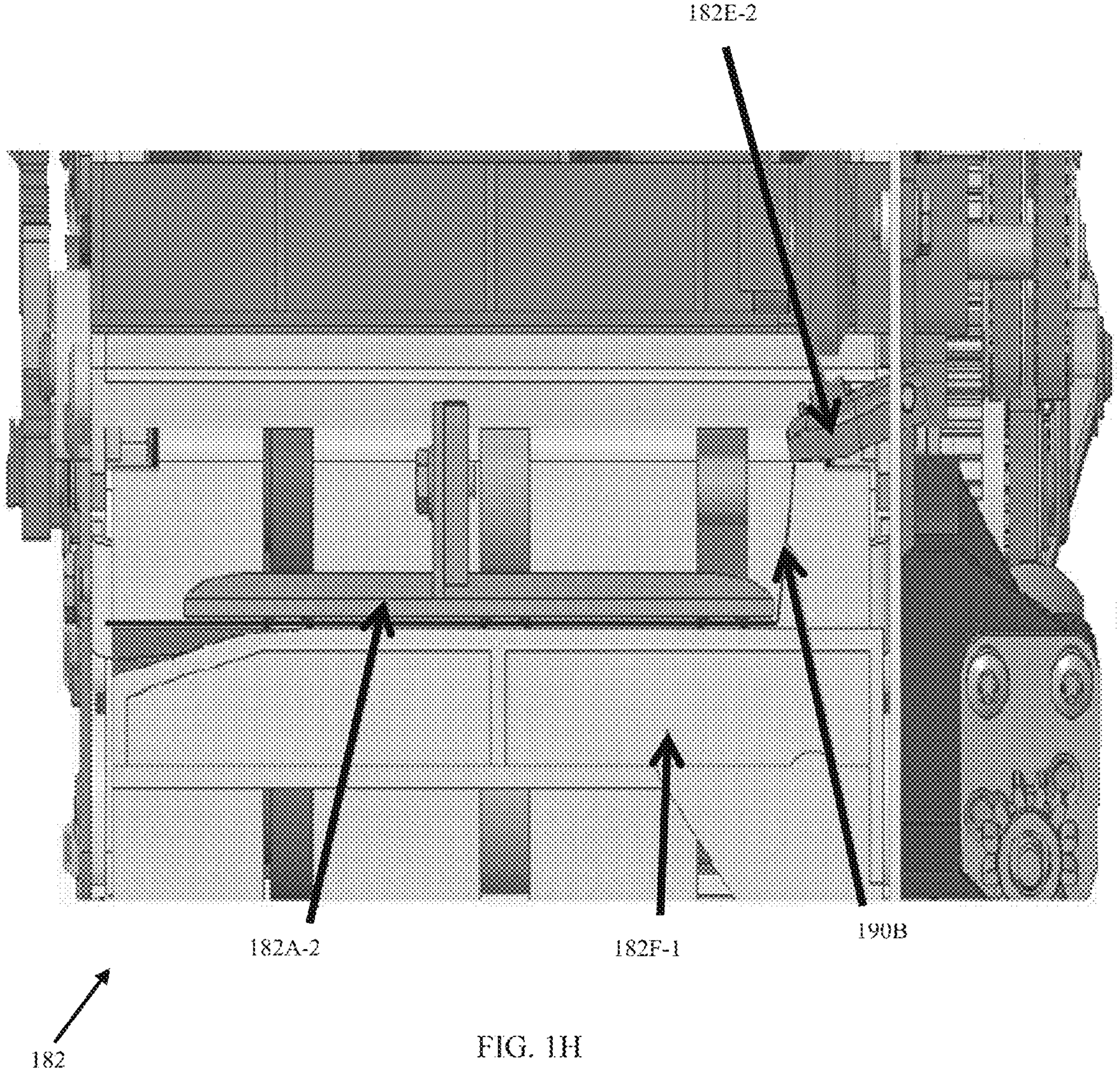
FIG. 1H is a diagram of an end-sectional view of the check in position after the stacking plate is actuated, according to an example embodiment.
Figure 1I:
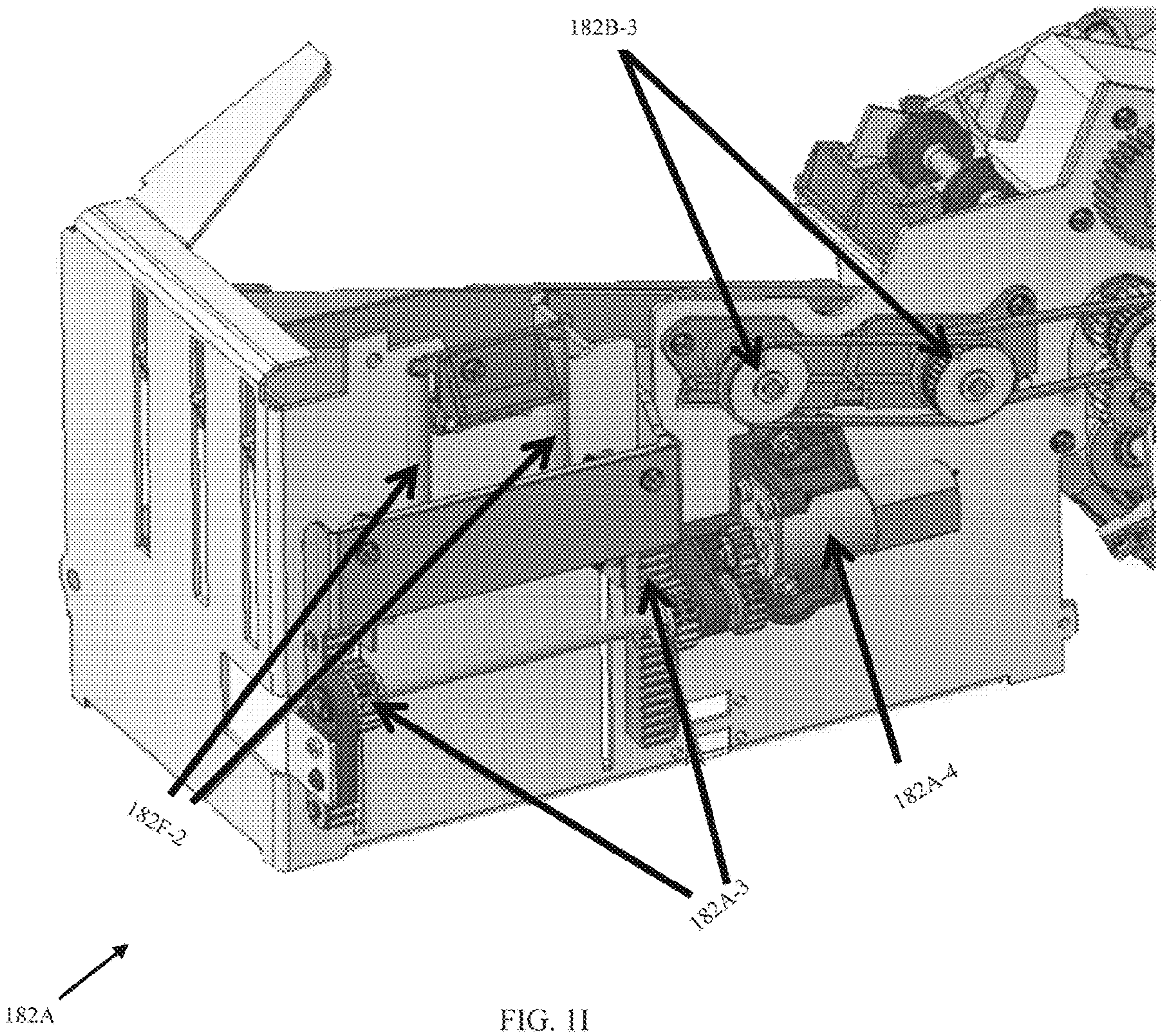
FIG. 1I is a diagram of a rear view of a pusher plate rack and pinion apparatus and media platform apparatus of the stacking bin, according to an example embodiment.

Pusher stacking plate 182A is driven by a Direct Current (DC) motor 182A-4 using a rack and pinion apparatus 182A-3 as shown in FIG. 1I below.

FIG. 1E is a diagram of a cross-sectional view having detail of a check 190 in final position before the stacking plate 182A is actuated, according to an example embodiment. Upon entry of a check 190 above platform 182F, a trailing edge 190A of the check 190 is stopped directly above fixed media guide 182D.

Fixed upper rollers 182B-1 remain in contact with check 190 to drive or urge check 190 into a final position before check 190 is stacked onto platform 182F. This final position illustrates a trailing edge 190A of check 190 which remains on or above fixed media guide 182D; adjacent to trailing edge 190A is a cliff edge 182A where a corresponding portion of check 190 is elevated above platform 182F (creating a small gap between the trailing edge 190A of check 190 and platform 182F— the trailing edge 190A of check 190 is approximately 10 mm).

FIG. 1F is a diagram of a top-down view of the pusher plate stacking bin with a check 190 in position before the stacking plate 182A is actuated, according to an example embodiment.

FIG. 1F provides a view from above pusher stacking plate apparatus 182 illustration a check 190 of 225 mm in length and 110 mm in width while check 190 has a trailing edge 190A that remains above the fixed media guide 182D by a 10 mm overlap and an opposing edge remains above hinged media guide 182E by a 13 mm overlap. This is the final position of check 190 before stacking plate 182A is actuated to stack and to push check 190 onto platform 182F.

FIG. 1G is a diagram of an end-sectional view of the check in position before the stacking plate 182A is actuated, according to an example embodiment.

FIG. 1G illustrates the final position of check 190 above platform 182F for a check 190 having a length of 225 mm and a width of 110 mm. Trailing edge 190A remain above platform 182F on top of fixed media guide 182D while the opposite edge of check 190 rests above hinged media guide 182E by approximately 13 mm. Hinged media guide 182E is trapped by platform 182F creating a pinch on check 190. Platform 182F is in an upper position and stacking plate 182A is in an upper position. The opposite end of check 190 (opposite trailing edge 190A) extends on top of hinged media guide 182E by approximately 13 mm. FIG. 1G also illustrates the hinged point 182E-1 of hinged media guide 182E. Moreover, FIG. 1G illustrates the position of check 190 before stacking plate 182A is actuated to stack the check onto platform 182F. Stacking plate 182A is still in an upper position 182A-1 in FIG. 1G.

FIG. 1H is a diagram of an end-sectional view of the check in position after the stacking plate 182A is actuated, according to an example embodiment.

Stacking plate 182A is shown in a lower position 182A-2 once actuated by DC motor 182A-4 causing rack and pinion apparatus 182A-3 to drive stacking plate 182A from an upper position 182A-1 into the lower position 182A-2 forcing the check onto platform 182F. Check 190 is folded 190B during entry into apparatus 182 and hinged media guide 182E is shown in a dropped or lower position 182E-2, dropped along hinged point 182E-1 when stacking pate 182A forces platform 182F downward into a lower position 182F-1.

FIG. 1I is a diagram of a rear view of a pusher plate rack and pinion apparatus 182A-3 and media platform apparatus 182F of the pusher plate stacking bin apparatus 182, according to an example embodiment.

DC motor 182A-4 drives rack and pinion apparatus 182A-3 once check 190 is in a final position on platform 182F causing stacking plate 182A to drive down against platform 182F, which compresses springs 182F-2 and stacks check 190 onto platform 182F. FIG. 1I also shows roller drive belts and gears 182B-3 for check bin transport apparatus 182B.

A length of pusher stacking plate 182A is shorter that a length of the platform 182F. Moreover, the length of pusher stacking plate 182A is configured and oriented within pusher plate stacking bin apparatus 182 such that as the pusher stacking plate 182A is moved towards platform 182F, the plate 182A moves past guides 182D and 182E without engaging or contacting guides 182D and 182E.

In an embodiment, fixed upper rollers 182B-1 and hinged lower rollers 182B-2 engage a top surface and a bottom surface of the media item upon entry into the pusher plate stacking bin apparatus 182 and to urge the media item above the media stacking platform 182F into the final position before the pusher stacking plate 182A is activated to stack the media item onto platform 182F.

In an embodiment, bin transport rollers 182B comprise two pair of rollers, each pair comprising one fixed upper roller 182B-1 and one opposing hinged lower roller 182B-2. When the media item is in the final position within apparatus 182, the first pair of rollers pinch the media item at a first location that is adjacent to a trailing edge of the media item and the second pair of rollers pinch the media item at a second location that is adjacent to a leading edge of the media item. This is different from conventional approaches that comprise rollers along the entire length of the media item within conventional stacking bins; as such, apparatus 182 requires less rollers than conventional stacking bins, which further reduces manufacturing costs and mechanical components associated with apparatus 182 when compared with conventional stacking bins.

Pusher stacking plate 182A has a smaller (reduced) stroke than what has been traditionally required. The stroke distance is approximately 18 mm compared to existing stroke distances of 74 mm required by existing pusher stake plates. By reducing the overlap between the trailing edge 190A of check 190 on fixed media guide 182D and the overlap between the opposite end of check 190 (opposite trailing edge 190A) on hinged media guide 182E from what has been conventionally thought necessary, the plate stroke can be reduced from 74 mm to approximately 18 mm, saving 56 mm in vertical distance. Additionally, since the stroke is substantially longer in existing pusher stacking plates, these existing plates require a more powerful motor using a combination of scissor linkage driven by ball and screw mechanism to drive the check through a narrow opening and against a spring loaded force with the check being folded on entry on both sides (only one fold is necessary with pusher plate stacking bin apparatus 182). Conversely, DC motor 182A-5 does not need to be as powerful as what is conventionally required, the DC motor 182A-5 has an internal gearbox of approximately 90 to 1 gearing, which allows it to be compact with a high torque output in a small space volume utilizing rack and pinion apparatus 182A-3.

As a result, pusher plate stacking bin apparatus 182 provides improved power and space efficiency over conventional check stacking bins and conventional pusher stacking plates. This allows for an overall space footprint of depository 100 to be decreased from what has conventionally been required or allows for increased feature function of other modules within depository 100 by permitting a size of depository 100 to remain fixed with other modules allowed to grow in size (for increased feature/function) by an amount of space saved by check stacking bin module 180 and pusher plate staking bin apparatus 182.

These and other embodiments are now discussed with reference to FIGS. 2-4.

Figure 2:
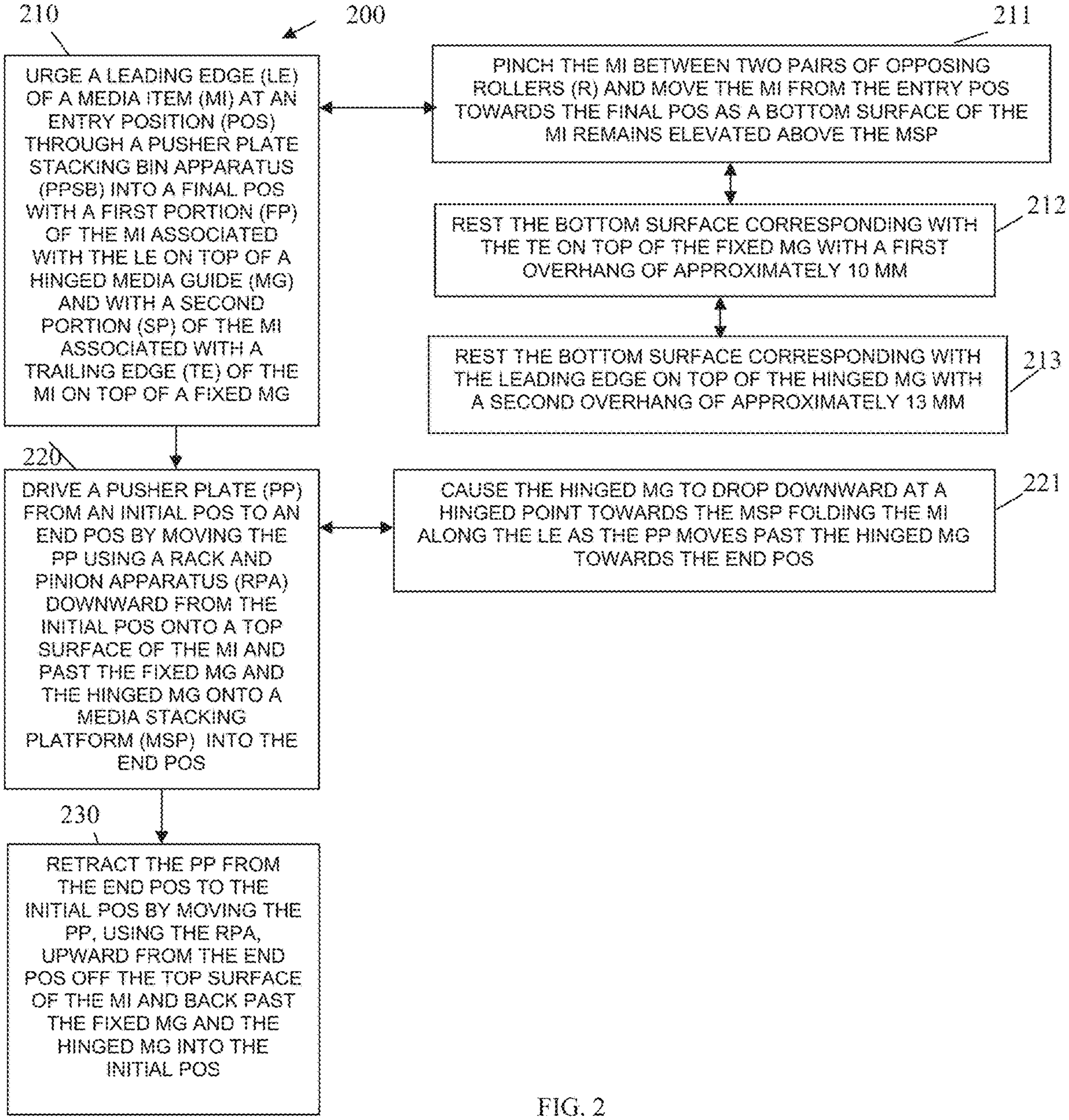
FIG. 2 is a diagram of a method of operating a pusher plate stacking bin within a valuable media dispenser/recycler of a transaction terminal, according to an example embodiment.

FIG. 2 is a diagram of a method 200 of operating a check stacking bin module 180 and/or pusher plate stacking bin apparatus 182, according to an example embodiment. The software module(s) that implements the method 200 is referred to as a “check stacking bin controller.” The check stacking bin controller is implemented as executable instructions/firmware programmed and residing within memory and/or a non-transitory computer-readable (processor-readable) storage medium and executed by one or more processors of a device.

In an embodiment, the device is a motherboard associated with depository 100.

In an embodiment, the device is a controller motherboard associated with a transaction terminal. The controller motherboard is connected through electronic circuitry to the electromechanical components of the novel stacking bin module 180 and/or 182 to urge a check into a final position within stacking bin module 180 and/or 182, activate motor 182A-4 causing pusher stacking plate 182A to drive a check onto platform 182F and causing platform 182F to drive downward by rack and pinion mechanism 182A-3.

At 210, the check stacking bin controller urges a leading edge of a media item at an entry position through pusher plate stacking bin apparatus 182 into a final position. A first portion of the media item associated with a leading-edge rests on top of hinged media guide 182E and a second portion of the media item associated with a trailing edge rests on top of fixed media guide 182D.

In an embodiment, at 211, the check stacking bin controller pinches the media item between two pairs of opposing rollers and moves the media item from the entry position towards a final position as a bottom surface of the media item remain elevated above media stacking platform 182F.

In an embodiment of 211 and at 212, the check stacking bin controller rests the bottom surface corresponding with the trailing edge on top of fixed media guide 182D with a first overhang of approximately 10 mm.

In an embodiment of 212 and at 213, the check stacking bin controller rests the bottom surface corresponding with the leading edge on top of hinged media guide 182E with a second overhang of approximately 13 mm.

At 220, the check stacking bin controller drives pusher plate 182A from an initial position to an end position by moving pusher plate 182A, using rack and pinion apparatus 182A-3, downward from the initial position onto a top surface of the media item and past fixed media guide 182D and hinged media guide 182E onto media stacking platform 182F and into the end position.

In an embodiment, at 221, the check stacking bin controller causes hinged media guide 182E to drop downward at hinged point 182E-1 towards media stacking platform 182F folding the media item along the leading edge as the pusher plate 182A moves past hinged media guide 182E towards the end position.

At 230, the check stacking bin controller retracts pusher plate 182A from the end position to the initial position, using rack and pinion apparatus 182A-3, upward from the end position off the top surface of the media item and back past fixed media guide 182D and hinged media guide 182E into the initial position.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

urging a leading edge associated with a first portion of a media item on top of a hinged media guide with a trailing edge associated with second portion of the media item on top of a fixed media guide;

driving a pusher plate along a top surface of the media item from an initial position to an end position past the fixed media guide and past the hinged media guide causing the media item to move onto a media stacking platform; and retracting the pusher plate up and off the top surface of the media item and from the end position back to the initial position past the fixed media guide and the hinged media guide into the initial position.

2. The method of claim 1, wherein driving further includes folding the media item along the leading edge on the media stacking platform as the pusher plate moves past the hinged media guide towards the end position.

3. The method of claim 1, wherein driving further includes driving, by a rack and pinion apparatus, the pusher plate from the initial position to the end position.

4. The method of claim 3, wherein retracting further includes retracting, by the rack and pinion apparatus, the pusher plate from the end position back to the initial position.

5. The method of claim 1, wherein driving further includes driving the pusher plate without the pusher plate contacting the fixed media guide and without the pusher plate contacting the hinged media guide.

6. The method of claim 1, wherein urging further includes pinching the media item between pairs of opposing rollers moving the media item from an entry position to a final position above a surface of the media stacking platform.

7. The method of claim 6, wherein pinching further includes resting the first portion of the media item onto the hinged media guide and the second portion of the media item onto the fixed media guide at the final position.

8. The method of claim 7, wherein resting further includes resting the first portion with a first overhang of approximately 13 mm on top of the hinged media guide.

9. The method of claim 8, wherein resting further includes resting the second portion with a second overhang of approximately 10 mm on top of the fixed media guide.

10. The method of claim 1, wherein a length of the pusher plate is less than a length of the media stacking platform.

11. The method of claim 1 further comprising, processing the method, by a controller of depository for a transaction terminal during a deposit transaction of the media item at the transaction terminal, wherein the media item is a check being deposited.

12. A depository, comprising:

a pushing plate stacking bin apparatus to stack checks deposited at the depository;

wherein the pushing plate stacking bin apparatus comprises:

- a pusher plate;
- a media stacking platform;
- a fixed media guide; and
- a hinged media guide;
- wherein the pushing plate stacking bin apparatus is adapted to urge a check from an entry position to a final position with a first portion of the check resting on top of the hinged media guide and a second portion of the check resting on top of the fixed media guide;
- wherein the pusher plate is adapted to engage a top surface of the check above the hinged media guide and the fixed media guide and move from an initial location to a final location past the hinged media guide and the fixed media guide with the check folded onto the media stacking platform;
- wherein the pusher plate is further adapted to lift off the top surface of the check at the final location and return back to the initial location once the check is folded onto the media stacking platform.

13. The depository of claim 12, wherein the pushing plate stacking bin apparatus further includes a rack and pinion apparatus to drive the pusher plate onto the top surface of the check from the initial location to the final location and to lift the pusher plate off the check at the final location back to the initial location.

14. The depository of claim 12, wherein the pushing plate stacking bin apparatus further includes springs attached to a bottom surface of the media stacking platform to compress and maintain tension on the check when the pusher plate retracts off the check and returns to the final location after the pusher plate folds and stacks the check onto the media stacking platform.

15. The depository of claim 12, wherein a length of the pushing plate is less than a length of the media stacking platform.

16. The depository of claim 12, wherein the depository is an integrated peripheral device of an automated teller machine, a self-service terminal, a point-of-sale terminal, or a kiosk that handles valuable media including the check.

17. The depository of claim 12, wherein the pushing plate stacking bin apparatus further includes two pairs of opposing rollers that pinch the check between each pair of opposing rollers and urge the check from the entry position to the final position.

18. A pushing plate stacking bin apparatus of a depository, comprising:

a pusher plate;

a media stacking platform;

a fixed media guide; and a hinged media guide;

wherein the pushing plate stacking bin apparatus is adapted to urge a media item from an entry position to a final position with a first portion of the media item resting on top of the hinged media guide and a second portion of the media item resting on top of the fixed media guide;

wherein the pusher plate is adapted to engage a top surface of the media item above the hinged media guide and the fixed media guide and move from an initial location to a final location past the hinged media guide and the fixed media guide with the check folded onto the media stacking platform;

wherein the pusher plate is further adapted to lift off the top surface of the media item at the final location and return back to the initial location once the media item is folded onto the media stacking platform.

19. The pushing plate stacking bin apparatus of claim 18 further comprising, two pairs of opposing rollers that pinch the media item between each pair of opposing rollers and urge the media item from the entry position to the final position.

* * * * *